United States Patent [19]

Cataldo

[11] 4,050,420
[45] Sept. 27, 1977

[54] CONSTANT PRESSURE-TEMPERATURE DELAYED COMBUSTION HIGH COMPRESSION RATIO ENGINE AND METHOD

[75] Inventor: Roy S. Cataldo, Birmingham, Mich.

[73] Assignee: General Motors Corporation, Detroit, Mich.

[21] Appl. No.: 574,046

[22] Filed: May 2, 1975

[51] Int. Cl.² .......................................... F02N 35/02
[52] U.S. Cl. ............................. 123/30 C; 123/32 ST; 123/193 P
[58] Field of Search ......... 123/193 P, 193 CP, 191 R, 123/191 S, 32 SA, 1 A, 32 B, 32 CY, 32 ST, 32 SW, 30 C

[56] References Cited

U.S. PATENT DOCUMENTS

| 2,323,028 | 6/1943 | Glamann | 123/32 SA |
| 2,534,346 | 12/1950 | Fenney | 123/32 SW |
| 2,736,306 | 2/1956 | McDuffie | 123/191 R |
| 3,583,373 | 6/1971 | Hardenberg | 123/32 SA |
| 3,776,212 | 12/1973 | Karlowitz | 123/32 SA |
| 3,923,015 | 12/1975 | Mukai et al. | 123/32 B |

FOREIGN PATENT DOCUMENTS 465,565   5/1937   United Kingdom ............... 123/32 B Primary Examiner—Carroll B. Dority, Jr.
Assistant Examiner—Craig R. Feinberg
Attorney, Agent, or Firm—Robert J. Outland

[57] ABSTRACT

A spark ignition internal combustion engine arrangement and method of operation are provided including high compression, in the range between about 17 to 1 and 30 to 1 of a lean mixture of air and fuel of sufficiently high octane to prevent preignition and detonation when compressed, late ignition of the charge, near top dead center, for combustion during the first part of the expansion phase with heat release controlled by the shape of the combustion chamber to obtain essentially constant pressure combustion up to a predetermined maximum temperature with the remaining fuel being burned at substantially constant temperature. This cycle requires a high initial rate of heat release for the constant pressure combustion portion of the burn followed by a much lower rate during the constant temperature portion. A combustion chamber and engine arrangement for operating on the novel cycle are also disclosed.

3 Claims, 5 Drawing Figures

CONSTANT PRESSURE-TEMPERATURE DELAYED COMBUSTION HIGH COMPRESSION RATIO ENGINE AND METHOD

FIELD OF THE INVENTION

This invention relates to internal combustion engines and more particularly to spark ignition internal combustion engines and methods for operating such engines to obtain high efficiency and power output while limiting maximum combustion temperatures.

BACKGROUND OF THE INVENTION

Conventionally, spark ignition engines have been developed to operate on approximations of the so-called Otto cycle wherein a combustible air-fuel mixture is compressed and burned in an approximately constant volume process occurring near the smallest volume of the combustion chamber. Operation on this cycle, while quite efficient, leads to high rates of pressure rise and high combustion temperatures which may require control of combustion rates through fuel additives to reduce problems of detonation or autoignition, as well as resulting in substantial exhaust emissions.

In recent years various devices and methods for modifying the combustion process have been utilized to obtain reductions in exhaust emissions. Such changes have included retarding spark timing, recirculating a portion of the exhaust gases and other methods for altering combustion. Although such methods have met with some success, they have also in general resulted in reduced efficiency of engine operation, which resultant increases in gasoline consumption for the vehicles powered by such engines.

SUMMARY OF THE INVENTION

The present invention provides a method of operating an internal combustion engine on a new engine cycle and means for obtaining such operation so as to provide a desirable combination of high efficiency and low emissions. The novel operating cycle involves unusually high compression of a lean air-fuel mixture of appropriate octane rating followed by combustion and burning in two steps of constant pressure and constant temperature combustion during expansion. Exemplary means for carrying out the novel cycle include a piston type spark ignition internal combustion engine having a novel combustion chamber design including two distinct combustion zones on opposite sides of the chamber. The chamber design is arranged to meet variable heat release requirements needed to perform the combination constant pressure-constant temperature combustion phase of the cycle.

The various details and advantages of the novel cycle and engine construction will be clearly understood from the following description of a preferred embodiment taken together with the accompanying drawings.

DESCRIPTION OF THE PREFERRED EMBODIMENT

Figure 1:
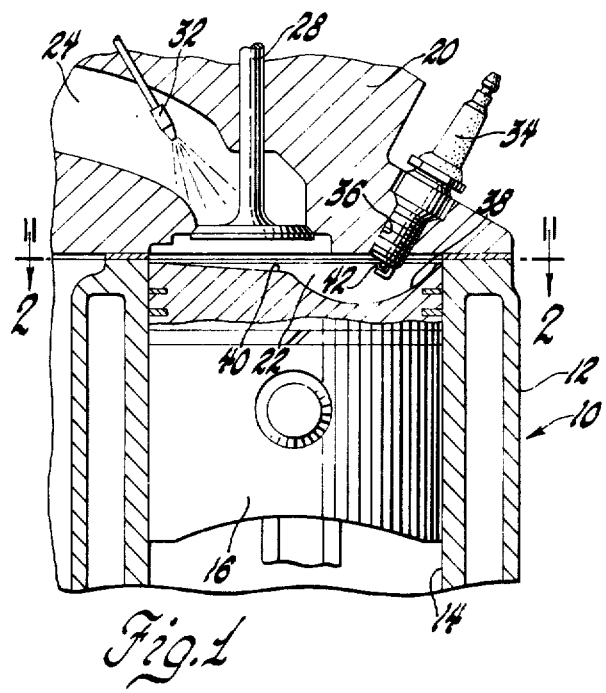
FIG. 1 is a fragmentary transverse cross-sectional view of a piston type spark ignition internal combustion engine formed according to the invention.
Figure 2:
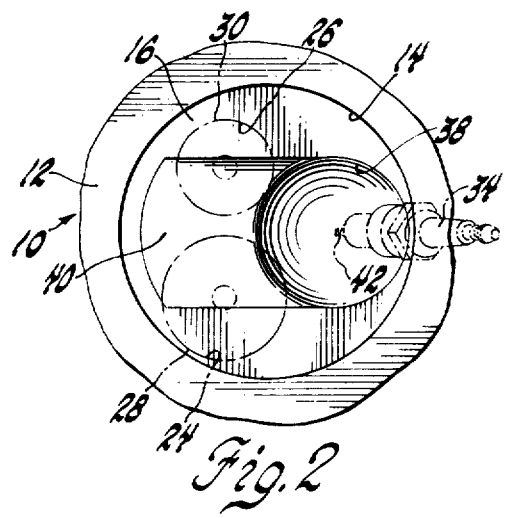
FIG. 2 is a cross-sectional view of the engine taken generally in the plane indicated by the line 2—2 of FIG. 1 as viewed in the direction of the arrows.

Referring now to the drawings in detail, numeral 10 generally indicates an internal combustion engine of the spark ignition, piston type, having the usual cylinder block 12 defining a plurality of cylinders 14 (only one being shown) each containing a reciprocable piston 16.

The outer ends of the cylinders 14 are closed in conventional fashion by a cylinder head 20 that, together with the cylinders and pistons, defines a variable volume combustion chamber 22 at the end of each cylinder.

The cylinder head is further provided with inlet and exhaust ports 24, 26, respectively, controlled by inlet and exhaust poppet valves 28, 30, respectively, that are conventionally actuated through valve gear, not shown, in timed relation with the movement of the piston.

Means are provided for supplying the inlet port 24 with a lean air-fuel mixture. In the present instance, these means include (1) any suitable fuel injection system (not shown) feeding a nozzle 32, that directs fuel into the inlet port 24 and (2) the connection of the main portion of the inlet port to a suitable air intake system, not shown.

The cylinder head is also provided with a spark plug 34 for each cylinder which extends into the combustion chamber 22 through an opening 36 in the cylinder head.

The combustion chamber is formed primarily in the piston with a bowl-like part-spherical recess 38 forming an enlarged portion on one side of the piston which merges with a shallow tapering portion 40 on the other side. The spark plug is preferably located with its spark gap 42 in the center of the bowl shaped portion for reasons that will be subsequently made clear.

Figure 3:
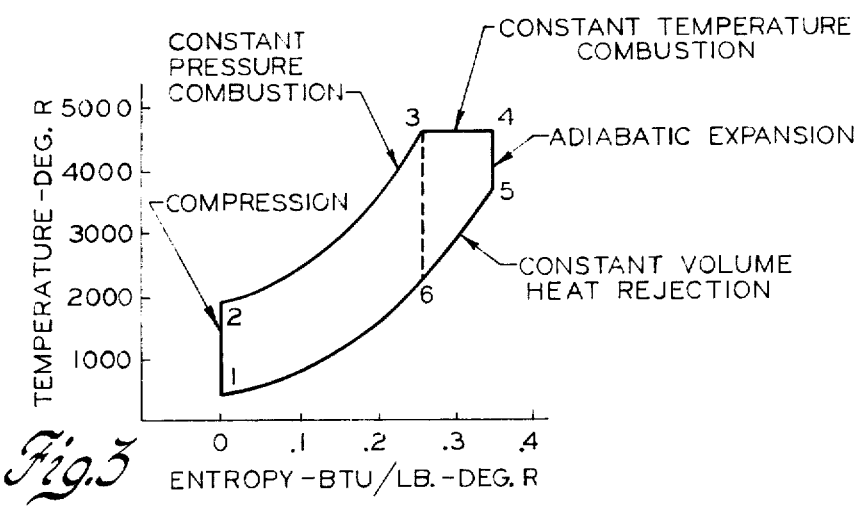
FIG. 3 is a representative temperature-entropy diagram illustrating the phases of the novel operating cycle for the engine of FIGS. 1 and 2.
Figure 4:
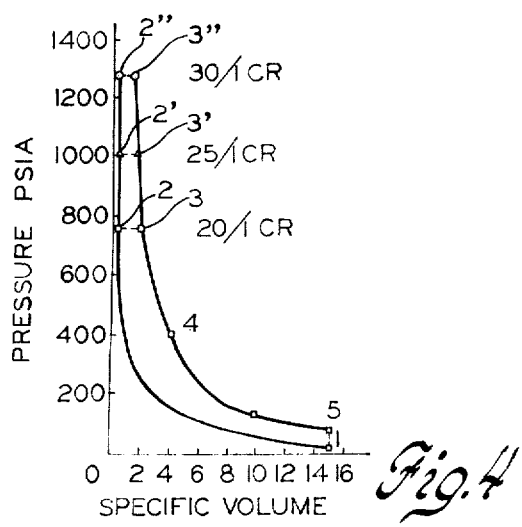
FIG. 4 is a representative pressure-volume diagram of an engine of the type indicated.

Referring now to FIG. 3 of the drawing, there is shown a temperature-entropy diagram illustrating the phases of the novel engine operating cycle and method of the present invention. FIG. 4 illustrates a pressure-volume diagram for the same cycle. The phases of the cycle shown in the two diagrams include adiabatic compression from points 1 to 2, combustion at constant pressure from points 2 to 3, continued combustion, but at constant temperature from points 3 to 4, adiabatic expansion from points 4 to 5 and heat rejection at constant volume, through exhaust of the burned mixture from points 5 to 1.

Figure 5:
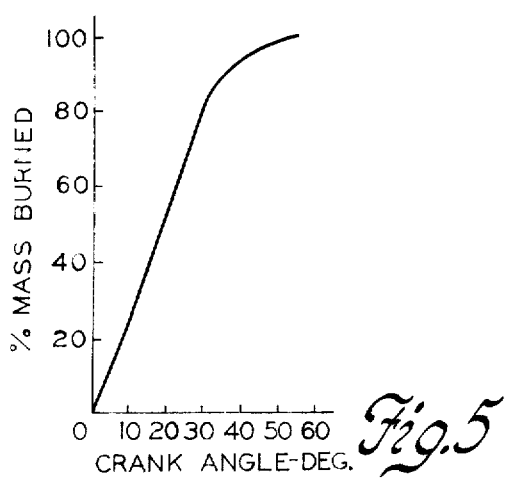
FIG. 5 is a diagram showing the rate of heat release versus crank angle required to obtain the desired operating cycle of FIGS. 3 and 4 in the engine of FIGS. 1 and 2.

FIG. 5 illustrates the variable rate of heat release during combustion relative to piston crank angle position that is required for obtaining the desired two-phase combustion step under the conditions shown in FIGS. 3 and 4. As may be observed, the required combustion rate is high during the constant pressure combustion phase and then slows rapidly during the constant temperature combustion phase. This slowing of the rate of combustion is necessary to limit combustion temperatures to a predetermined constant maximum value during the later stages of combustion, as shown in FIG. 3.

The shape of the combustion chamber 22, previously referred to, is developed in known manner to obtain the heat release curve desired under the conditions of compression ratio and air-fuel ratio established for operating the engine. Thus, the bowl-shaped recess in the piston with the spark plug centered in it causes initial rapid burning of the mixture in this part of the chamber. Subsequently, the terminal portion of the fuel is burned in the remaining relatively narrow portion of the combustion chamber, which has now been enlarged somewhat by downward movement of the piston, resulting in the controlled lower rate of combustion required for constant temperature combustion of the last portion of the fuel.

While the particular design of the combustion chamber illustrated is intended to obtain the desired heat release characteristics, it should be understood that these burning characteristics might equally well be obtained with other combustion chamber configurations or in other configurations of engines such as, for example, rotary combustion engines. Thus, the specific engine and combustion chamber configuration illustrated is not intended to limit the application of the disclosed cycle to engines and combustion chambers of this form.

The method of operating an engine in accordance with the invention includes certain operating requirements:

1. A high engine compression ratio in the range of from about 17 to 30:1,

2. A lean but burnable air-fuel ratio supplied to the combustion chamber and formed with fuel of sufficiently high octane to permit compression to the selected compression ratio without preignition or detonation problems, 3. Retarded ignition, with the spark timing set only a few degrees before top dead center. Allowing for normal ignition lag, combustion will then take place completely during the expansion portion of the cycle, and 4. A special combustion chamber design to obtain the non-linear rate of heat release required to burn the initial portion of the fuel supplied under constant pressure combustion conditions, with the remainder of the fuel being burned under constant temperature combustion conditions, the total combustion occupying an early part of the expansion stroke.

The novel engine cycle involves the following steps as indicated in FIGS. 3 and 4.

1. Compression of the lean air-fuel mixture provided through a high compression ratio of between 17 and 30:1, the air-fuel ratio of the mixture and the fuel octane rating having been selected to prevent preignition or detonation when so compressed, 2. Combustion of the first portion of the fuel charge under constant pressure conditions during the initial part of the expansion stroke, 3. Combustion of the remainder of the fuel charge under constant temperature conditions at a predetermined maximum temperature with combustion completed in the first half of the expansion stroke, 4. Adiabatic expansion of the burned gases during the remainder of the expansion stroke, and 5. Constant volume heat rejection through exhaust of the gases from the combustion chamber and induction of a fresh charge into the engine cylinder.

It is desirable to utilize fuel injection into the cylinder intake port to reduce problems of distribution in the inlet manifold that may be caused by the use of lean air-fuel mixtures. This also permits operation without a heated manifold. Keeping the inlet charge as cold as possible reduces the likelihood of autoignition problems and allows the use of lower octane fuels.

Problems of autoignition and detonation are also reduced by the use of lean air-fuel ratios selected to permit compression to high ratios without autoignition. To the extent desired, high octane fuels may be used to control detonation, relaxing the need for lean air-fuel ratios.

It is apparent that this thermodynamic cycle has the ability to limit peak temperatures to a greater extent than the Otto cycle, while operating with the same lean air-fuel ratios, due to controlled burning during the expansion cycle, rather than application of the Otto cycle's approximately constant volume combustion process. Thus, oxides of nitrogen emissions should be directly controllable by selection of the maximum combustion temperature. Further, long burning time at relatively high temperatures should allow the cylinder itself to act as an oxidizing reactor during the intermediate portion of the expansion phase, thus reducing both hydrocarbons and carbon monoxide emissions. The cycle avoids high rates of pressure rise, since combustion occurs at a controlled rate during the expansion portion of the cycle only. Also, due to the greater than normal expansion of the chamber during the combustion process, the latter part of the charge is burned with a lower than usual surface to volume ratio of the combustion chamber, which should further reduce hydrocarbon emissions.

While the constant pressure-constant temperature combustion cycle has been disclosed in conjunction with a specific form of piston engine and an exemplary configuration of combustion chamber, it is recognized that this cycle is not limited to such chambers or engines. In fact, since known forms of rotary engines inherently have long burning paths, it is merely required to reshape the combustion chambers of such engines to obtain the characteristic burning requirements of this invention, along with high compression ratio, lean air-fuel ratio and delayed spark timing to achieve the same benefits in rotary engines.

Since those skilled in the art will from this disclosure be enabled to develop various modifications of the disclosed devices and methods without departing from the inventive concepts taught, it is intended that this invention be limited only by the language of the following claims.

What is claimed is:

1. A method of burning air-fuel mixtures in an internal combustion engine to obtain efficiency and power while controlling emissions, said method comprising the steps of supplying a lean combustible air-fuel mixture to a closed variable volume combustion chamber, compression said air-fuel mixture through a predetermined volume ratio in the range between about 17 and 30 to 1, said combustible mixture being prepared with a combination of lean air-fuel ratio and fuel octane sufficiently high to prevent preignition and detonation when so compressed, igniting said mixture other than by the heat of compression near the end of said compression step and burning said mixture following the end of said compression step, expanding said mixture during and after combustion through said predetermined volume ratio with an output of work to a movable wall associated with said combustion chamber, and controlling the burning of said mixture to provide an initial phase of rapid combustion under substantially constant pressure conditions while raising the combustion gas temperature to a predetermined maximum temperature with the remainder of the fuel being burned under substantially constant temperature conditions at about said predetermined temperature.

2. An internal combustion engine having means defining at least one variable volume combustion chamber operable through a cycle including compression and expansion steps, means providing in said compression step a combustion chamber compression ratio in the range of from about 17 to 1 to about 30 to 1, means for admitting to said combustion chamber, in advance of each said compression step, combustible air-fuel mixture having a combination of lean air-fuel ratio and fuel octane sufficiently high to prevent preignition and detonation when compressed to the corresponding compression ratio of said combustion chamber, spark ignition means in said combustion chamber and timed to ignite said air-fuel mixture near the end of said compression step for propagation of combustion during said expansion step, said combustion chamber comprising means to control the rate and time of combustion of said mixture to provide an initial phase of rapid combustion under essentially constant pressure conditions during which the combustion gas temperature is raised to a predetermined maximum temperature, and a secondary phase of slower combustion during which the remainder of the fuel is burned under essentially constant temperature conditions at about said predetermined temperature.

3. An internal combustion engine comprising means defining a closed-end cylinder, a piston reciprocably movable in said cylinder and having an end opposing and defining with the closed end of said cylinder a variable volume combustion chamber, said chamber having on one side an enlarged bowl-like portion formed by a recess in said piston end and merging with an axially shallower portion on the other side, and a spark plug mounted in said cylinder end and disposed centrally of and opposite said enlarge portion, inlet and exhaust means connected with said combustion chamber, and means interrelating said piston, spark plug and inlet and exhaust means to perform an operating cycle including the steps of inlet to said chamber, compression, ignition, combustion, expansion, and exhaust from said chamber of an air-fuel mixture, said compression being through a predetermined ratio in the range from about 17 to about 30 to 1, means to provide said air-fuel mixture to said inlet means in a form having a combination of lean air-fuel ratio and fuel octane sufficiently high to prevent pre-ignition and detonation when compressed through said predetermined compression ratio, means to cause said ignition at about the end of said compression step so as to cause said combustion to occur during the first part of said expansion step and said combustion chamber configuration comprising means to provide an initial phase of rapid combustion under essentially constant pressure conditions during which the combustion gas temperature is raised to a predetermined maximum temperature, and a secondary phase of slower combustion during which the remainder of the fuel is burned at essentially constant temperature conditions at about said predetermined temperature.

* * * * *